United States Patent Office

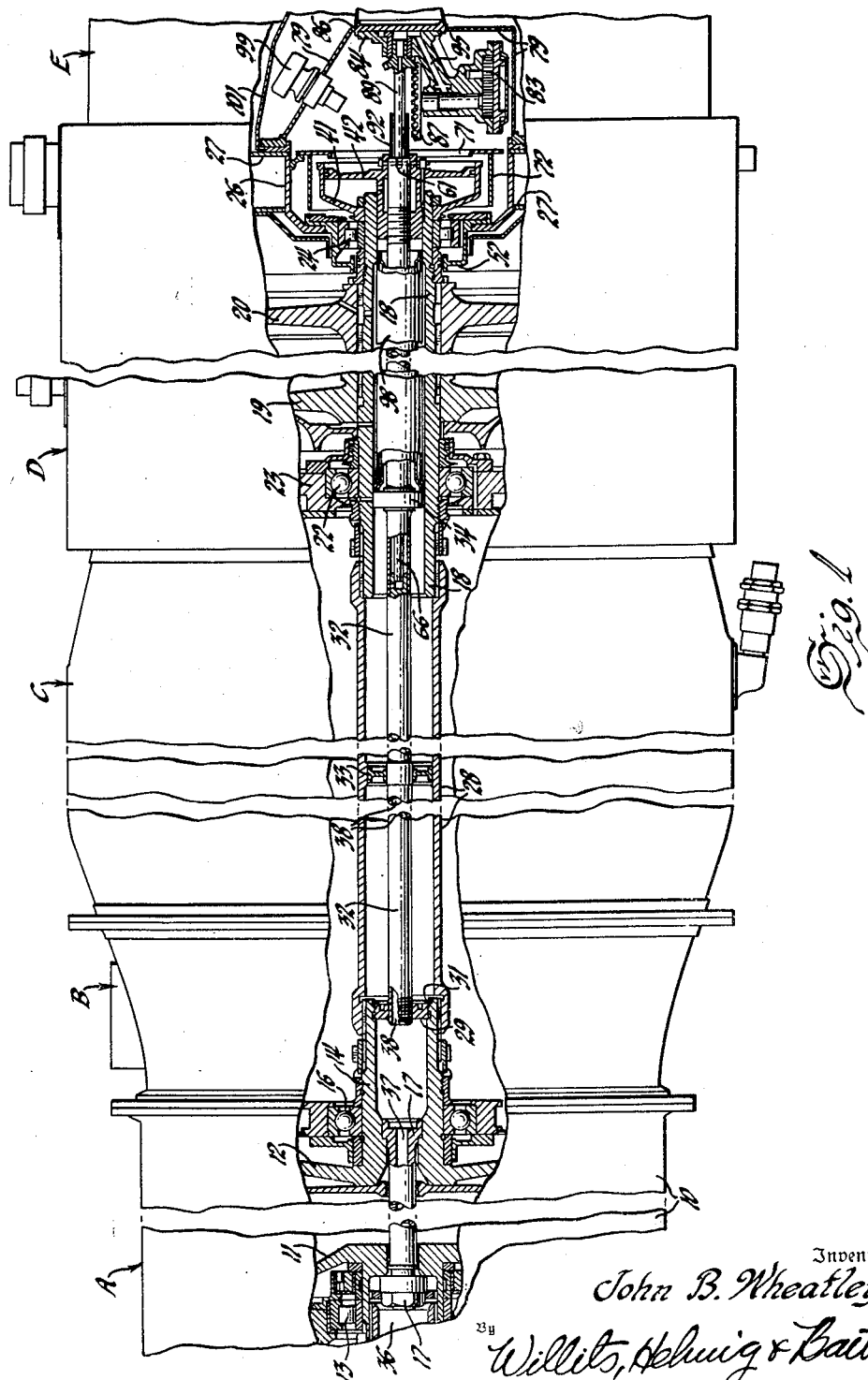

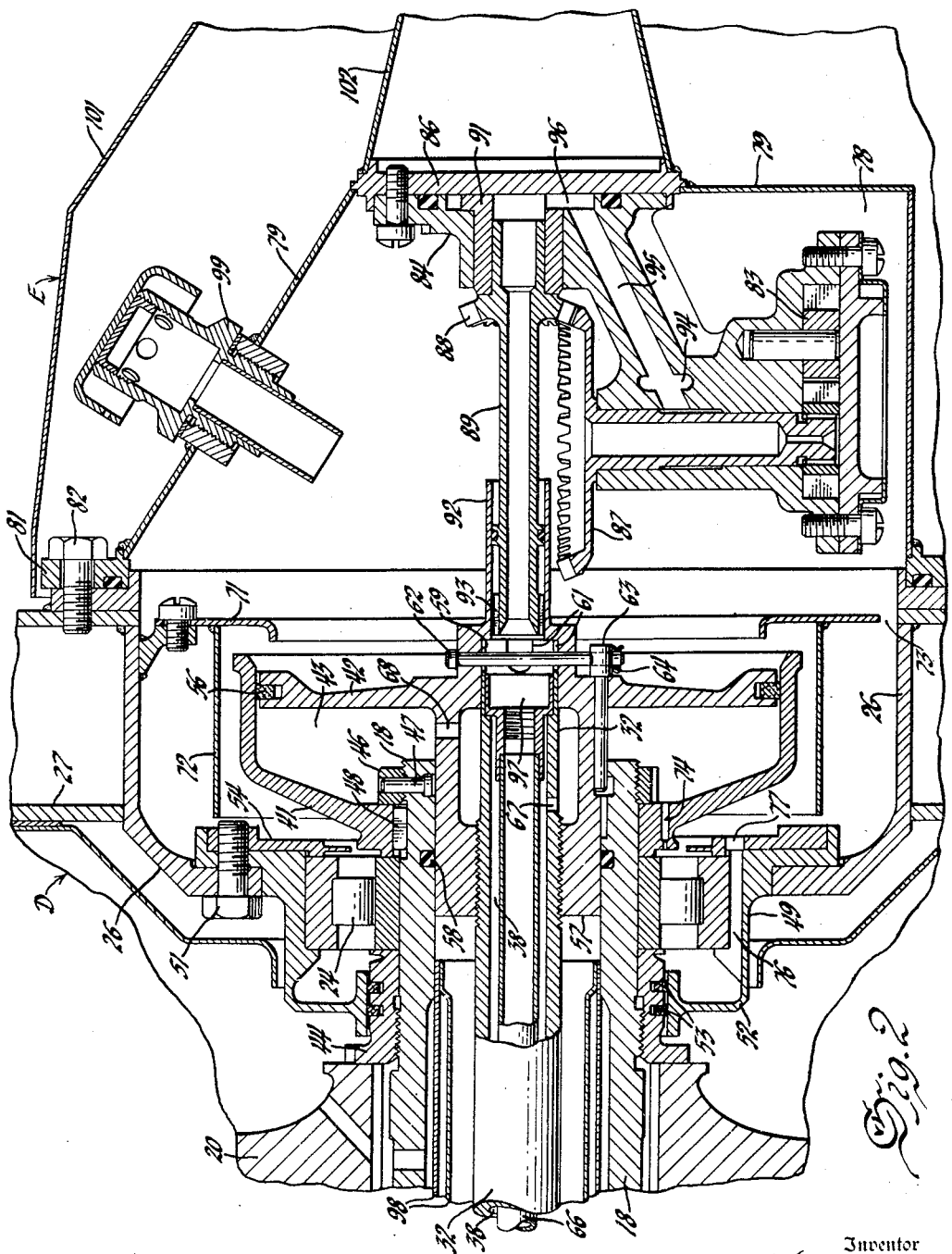

2,779,531
Patented Jan. 29, 1957

2,779,531

GAS TURBINE ENGINE WITH HYDRAULIC THRUST BALANCING

John B. Wheatley, Indianapolis, Ind., assignor to General Motors Corporation, Detroit, Mich., a corporation of Delaware Application December 29, 1950, Serial No. 203,321

19 Claims. (Cl. 230—116)

My invention relates to thrust balancing in rotating machinery and is most particularly directed to reduction of the thrust load on the bearings of gas turbine engines.

The invention will be explained and described herein in relation to its application to a gas turbine engine of the type including an axial-flow compressor and an axial-flow turbine coaxial with the compressor although, as will be apparent, the invention is susceptible of other applications.

Many turbo-machines, as for example, compressors and turbines of the axial-flow type, develop substantial end thrust when in operation; in other words, the rotor of the machine tends to move along its axis and must be restrained. Since no significant movement of the rotor axially of the stator can be tolerated, it is customary to provide a thrust bearing which receives the end thrust and locates the rotor axially of the stator.

It is desirable to reduce the load on the thrust bearing as much as possible so as to permit the installation of a bearing of lower capacity or to increase the life of the bearing in service. Because of the high temperatures encountered in gas turbines, and the necessarily compact design of aircraft gas turbines, the environment of the thrust bearings is not favorable to long life and is not adapted to the installation of very large bearings.

The discharge temperature of the compressor in such engines may reach 800° F., and the temperature of the gases flowing through the turbine is usually in the range from 1200° to 1600° F. While the bearings may be protected to some extent from the high temperatures, it is impossible to operate them at temperatures favorable to good lubrication and long endurance.

The end thrust of the compressor is normally in the direction of the intake and the end thrust of the turbine is normally toward the exhaust end. Therefore, if the flow through the two machines is in the same direction and they are coaxial, it is possible to couple the two rotors together so that the opposing end thrusts are cancelled to some extent and only the difference between the thrusts must be provided for by thrust bearings. This scheme is readily workable in certain types of engines in which the stators of the compressor and turbine are maintained at a constant axial distance from each other. In typical aircraft gas turbine engines, however, the combustion apparatus is disposed between the compressor and the turbine, and thermal expansion of the combustion chamber may vary the distance between the turbine and compressor by as much as a quarter of an inch. If the combustion section itself does not constitute the frame joining the compressor and turbine, some other framework must be provided, and heat radiated from the combustion section in operation will increase the length of the engine frame.

Because of this variation in length of the engine, it is not feasible to couple the compressor and the turbine rotors rigidly together, since the expansion of the interconnecting shaft will vary from that of the structure joining the turbine and compressor stators. It has been common practice, therefore, to provide individual shafts for the compressor and turbine, with a thrust bearing for each, and a splined coupling between the two shafts to allow for expansion and contraction of the engine frame.

It is possible without too much difficulty to substantially balance the end thrust of the compressor by providing a balance piston, which may be the face of a compressor wheel, and biasing the piston by air bled from the compressor discharge. This type of solution is not readily applicable to gas turbines, however, because of the exceedingly high temperatures of the motive fluid, and is not satisfactory for high-pressure compressors for the same reason.

The magnitude of the problem may be indicated by the fact that the compressor and turbine end thrusts are calculated to be about 4200 pounds and about 5700 pounds, respectively, under full load conditions in a particular gas turbine rated at about 2500 horsepower. Since this engine operates at over 12,000 R. P. M., the burden on the thrust bearings, if not reduced, would be quite serious. It will be noted that the resultant of the two thrusts is only approximately 1500 pounds.

My invention is directed to a system and arrangement by which the opposed end thrusts of the turbine and compressor may be combined so that substantially only the resultant thrust, which is relatively small, must be withstood by the thrust bearings. The invention overcomes the difficulties presented by thermal expansion. The invention greatly reduces the load on the turbine thrust bearing and eliminates the need for a thrust-balancing air piston for the compressor, while maintaining a light load on the compressor thrust bearing.

This highly desirable result is achieved by coupling the two shafts together for transmission of axial force therebetween through a fluid-filled expansible-chamber device, preferably a piston and cylinder arrangement, which transmits end thrust while accommodating the necessary relative axial movement of the shafts due to thermal expansion of the engine. While the piston and cylinder could be supplied with fluid under high pressure to generate the required axial force, it is a feature of the invention that the larger portion of the axial force is generated by centrifugal force due to rotation of the cylinder with the shafts to which it is coupled. This feature permits the use of a cylinder and piston of relatively small area supplied from a source of fluid under a moderate pressure.

For the particular engine mentioned above, a hydraulic cylinder developing 4000 pounds thrust at rated full load engine R. P. M. would substantially balance the load on the compressor thrust bearing and reduce the load on the turbine thrust bearing by 70% under full load conditions.

The invention presents the further advantage that the thrust bearings are not loaded when the engine is out of action, or loaded substantially when it is being cranked or started, since the thrust depends upon rotation of the engine.

Unless means are provided to lubricate the bearings of a gas turbine engine before the starting cycle is initiated, the supply of lubricating oil to the bearings picks up gradually as the engine and the lubricating oil pump driven thereby are accelerated by the starter. Since prelubricating arrangements of the type referred to are burdensome, they are not ordinarily used; therefore, it is best to have no substantial load on the bearings until the engine has been brought up to a speed at which normal lubricating oil flow is provided.

The principal objects of the invention are to provide improved thrust balancing for gas turbine engines; to improve the thrust balancing of rotating machinery in general; to provide a thrust balancing system for gas turbine engines and the like which accommodates changes in dimensions of the engine; to provide thrust balancing without loading the bearings when the engine is idle or starting; to balance or reduce end thrust by a hydraulic motor; to reduce end thrust of a shaft by a hydraulic motor actuated by centrifugal force due to rotation of the shaft; and to provide a thrust balancing apparatus which is simple, compact, reliable, and light in weight.

The succeeding detailed description of the preferred embodiment of the invention will make clear to those skilled in the art the advantages of the invention and the preferred mode of realization of the stated objects.

Referring to the drawings: Figure 1 is a longitudinal view of a gas turbine engine with certain parts shown in section along the axis of the engine and Figure 2 is a vertical sectional view of the rear turbine bearing, the thrust balancing cylinder, and adjacent mechanism, taken on a plane along the axis of the engine.

The engine illustrated in Figure 1 is representative in its general arrangement of a well-known type of gas turbine engine intended for aircraft propulsion. The principal elements of the engine are an axial-flow compressor A, a midframe B which includes the outlet passage or diffuser of the compressor section, a combustion section C, a turbine D, and an exhaust system E. The compressor is driven by the turbine, which furnishes additional power to drive an aircraft propeller or for other purposes. The air discharged by the compressor is heated by burning fuel in the combustion section C. The hot compressed gases drive the turbine D and are exhausted through the duct E. Since the general nature of such engines is well understood by those skilled in the art to which the invention relates and the principles of the invention may be understood without references to details of the engine, the engine will not be described in detail herein in the interest of conciseness. The compressor A comprises a casing or stator 10 within which is mounted a rotor shown partially and comprising a plurality of wheels or disks, the forward wheel 11 and the final wheel 12 being shown. These wheels as is customary mount blades which cooperate with blades fixed in the stator to compress the air. The forward disk 11 comprises a stub shaft which is supported in a roller bearing 13 mounted in the forward end of the compressor frame. The rear disk 12 comprises a stub shaft 14 mounted in a ball thrust bearing 16 which may be supported in the compressor stator 10. The compressor wheels are held together by a tie bolt 17 to form a unitary rotating structure. Although a disk type of compressor rotor is illustrated, it will be apparent that the type of compressor rotor is immaterial so far as the invention is concerned.

The compressor A is bolted to the midframe B and the combustion section C is likewise bolted to the midframe and comprises a structural element or frame by which the turbine D is coupled through the midframe and combustion section to the compressor. The structural details of this frame are immaterial to the invention.

The turbine casing D contains the turbine nozzle ring and fixed vanes (not illustrated) and supports the turbine rotor shaft 18 on which one or more turbine wheels are mounted such as wheels 19 and 20. The turbine shaft 18 is supported by a ball thrust bearing 22 mounted in a frame member 23 of the turbine and a roller bearing 24 likewise supported from the turbine stator. The bearing 24 is mounted in a bearing support ring 26 which is supported by a number of radial struts 27 extending through the exhaust passage of the turbine.

The turbine shaft 18 is coupled to the compressor shaft 14 by a hollow shaft or coupling member 28 which is internally splined at both ends to engage external splines on the shafts 14 and 18. The spline arrangement permits longitudinal displacement of the compressor and turbine due to expansion of the sections B and C of the engine. An internally and externally threaded bushing 29 is mounted in the internally threaded end of the compressor shaft 14, and may be secured by a snap ring 31. A tie bolt 32 threaded into the bushing 29 extends through the coupling member 28 and the turbine shaft 18 to the rear end of the turbine shaft. This tie bolt may be supported by bushings 33 and 34 to prevent whipping of the tie bolt.

Lubricating oil to supply the thrust balancing mechanism of the invention and to lubricate the bearings of the compressor and turbine shafts is supplied by an oil pump (not shown), preferably driven by the engine, from which oil is conducted to a chamber 36 at the forward end of the compressor shaft. From chamber 36, the oil proceeds through a passage 37 in the compressor tie bolt 17, through the hollow stub shaft 14, and through a passage 38 defined by the tubular tie bolt 32. The manner in which the compressor bearing and the forward turbine bearing are lubricated is of no concern to us here and will not be described.

Referring now to Figure 2, the thrust balancing mechanism of the invention comprises an annular cylinder 41 mounted on the turbine shaft and open at one end and a piston 42 reciprocable in the cylinder 41, the cylinder and piston defining a fluid chamber 43. The rear turbine wheel 20 abuts a collar 44 threaded on the shaft 18 and the inner race of the roller bearing 24 is held between the collar 44 and the hub of cylinder 41. The cylinder 41 is retained by a collar 46 threaded onto the end of the turbine shaft 18, which is locked against rotation by a radial pin 47. A key 48 constrains the cylinder 41 to rotate with the turbine shaft. The outer race of bearing 24 is held in a cage 49 mounted in the bearing support 26 by cap screws 51. The cage 49 includes a portion 52 which forms an enclosure at the front of the bearing and cooperates with seals 53 mounted in grooves in the turbine shaft collar 44 to prevent escape of lubricating oil from the bearing 24 to the turbine rotor. A bearing retainer 54 is mounted in the cage 49 by the cap screws 51.

The piston 42 is fitted with a seal ring 56 in a groove in its outer surface. The piston 42 is integral with a hub 57 which is machined for a sliding and rotating fit in the hollow turbine shaft 18, which is fitted with an O-ring 58 engaging the hub 57. The hub 57 is internally threaded so that it may be screwed onto the tie bolt 32. The end of the tie bolt is piloted in a bore 59 in the hub of the piston 42 and is formed with slots 61. A pin 62 extending diametrally through the hub of the piston 42 and the slots in tie bolt prevents relative rotation of the piston and tie bolt. The pin 62 also passes through the cross-drilled head of a pin 63 extending axially of the hub 57 which keys the hub 57 to the turbine shaft 18 to prevent rotation of the piston relative to the turbine shaft. A cotter key 64 or the like holds the pin 62 in place.

As previously stated, oil from the oil pump of the engine is circulated rearwardly through the tie bolt 32 within the turbine shaft. This oil flows through passage 38 between the inner wall of the tie bolt and a scavenge oil return tube 66 and through a radial port 67 in the tie bolt into an annular recess in the hub 57 from which it is discharged through a radial passage 68 in the hub into the chamber 43 of the cylinder 41.

Since the cylinder 41 is fixed to the turbine shaft and the piston 42 is fixed to the tie bolt which is coupled to the compressor shaft, the pressure of fluid in the chamber 43 will bias the turbine rotor forwardly and the compressor rotor rearwardly. This action will be described more fully in connection with the operation of the device.

A shield comprising an annular disk 71 and a sheet metal cylinder 72 welded thereto disposed around the cylinder 41 serves to catch any oil leaking from the cylinder. The oil drains from the shield 72 into a sump 73 in the bottom of the bearing support 26.

The rear turbine bearing 24 is lubricated from the chamber 43 by a jet discharged from an orifice 74 in the front wall of the cylinder into the bearing. Oil flowing from the bearing 24 drains principally through the forward end of the bearing due to the arrangement of the retainer 54, and flows into the bottom of the forward portion 52 of the bearing retainer and thence to the sump 73 through a groove 76 in the bearing cage 49 and a hole 77 in the retainer 54. The scavenge oil then flows from the sump 73 between the bearing support 26 and the disk 71 into a scavenge pump chamber 78. This chamber is formed by a sheet metal enclosure 79 which is integral with a ring 81 secured to the struts 27 by cap screws 82. A scavenge pump 83, the structure of which is immaterial to the invention, is mounted in the sump 78. The pump 83 is supported by a bracket 84 mounted on a disk 86 integral with the housing 79. A bevel gear 87 on the pump drive shaft is driven by bevel pinion 88 on a hollow shaft 89, one end of which is supported for rotation in a sleeve 91 in the bracket 84. The forward end of the shaft 89 is telescoped within a shaft 92 constituting an extension of the hub of piston 42, the shaft 89 being driven through mating splines 93 on the shafts 89 and 92. The scavenge pump discharges through passages 94, 95 and 96, through the interior of shaft 89, and through a bushing 97 into the tube 66 through which the oil is carried to the forward end of the turbine and discharged by means immaterial to this invention. The bushing 97 serves as a support for the tube 66 and also closes the end of the pressure oil passage 38 between the tie bolt 32 and tube 66.

Cylindrical heat shields 98 of bright sheet metal are disposed between the turbine shaft and the tie bolt to provide dead air spaces and minimize heat transfer from the turbine shaft to the lubricating oil flowing in the tie bolt.

The pump housing 79 is provided with a breather fitting 99 communicating with the chamber inside the inner cone 101 of the turbine exhaust, commonly referred to as a tail cone. The tail cone is supported on a conical bracket 102 welded to the pump housing 79.

In assembling the engine, the sections A, B, C, D, and E may be regarded as separate sub-assemblies. After the compressor and combustion section are mounted on the mid-frame B, the coupling member 28 is engaged with the compressor shaft, the turbine assembly D is then mounted on the combustion section, the turbine shaft 18 being inserted in the coupling member. The exhaust section E is left off until a later stage in the assembly. The cylinder 41 is in place as a part of the turbine assembly but the piston 42 and tie bolt are not in place at this time. The tie bolt 32 is inserted through the supporting bushings 33 and 34 and screwed fully into the sleeve 29. The locating pin 47 is inserted and the piston 42 is put in place and screwed onto the tie bolt, the hub 57 retaining the pin 47. When the piston 42 is approximately in its correct position, the pin 62 is inserted through the hub of the piston and a pair of the slots 61 in the end of the tie bolt, and the piston and tie bolt are then backed off until the piston is aligned with the turbine shaft so that the key 63 may be inserted. The pin 62 is retracted to permit insertion of the key 63 and is then seated, locking the key 63. A cotter key 64 then retains the pin 62. After this assembly has been completed, the housing 79 is mounted, the pump shaft 89 being inserted in the shaft 92. The tail cone 101 and the outer duct of the exhaust system E may then be assembled in place. The axial position of the piston 42 at assembly is not critical, but must be such as to allow for axial movement in the cylinder 41 and shaft 18 to accommodate thermal expansion.

In considering the operation of the thrust balancing system, we may start with the engine at rest. The oil pump is not operating, and there is no supply of oil to the main engine bearings or to the thrust-balancing chamber 43. There may, of course, be oil trapped in the chamber 43 from previous operation. To start the engine, it is coupled to an external source of power which accelerates the engine. At the beginning of the acceleration, there is no significant thrust load on the bearings either from the rotors or from the balancing cylinder, which is desirable, as they may be substantially dry and, at least, are not supplied with sufficient oil to cool them. As the engine begins to pick up speed, the oil pump circulates oil to the bearings and to the chamber 43, from which the rear turbine bearing is lubricated. At a relatively low engine speed, perhaps several thousand R. P. M., fuel is introduced and ignited and, with the assistance of the starter, the engine continues to gain speed until it is self-sustaining and running idle.

In normal idling operation, the normal static pressure of the oil is present in the chamber 43 plus pressure due to centrifugal force arising from rotation of the oil with the cylinder. In this connection, it will be noted that the oil is introduced to the chamber 43 at the inner diameter thereof and when the chamber is rotating the pressure increases from the inner diameter to the outer diameter of the chamber. Obviously, the pressure gradient will increase with increase in rotational speed, since the centrifugal force on any elementary particle of oil is proportional to the square of its angular velocity about the axis. The pressure component due to centrifugal force and, therefore, the total pressure, increase when the engine is accelerated from idling speed to normal operating speed for powered flight. Thus the balancing force generated by the hydraulic cylinder varies in a general way in accordance with the demand for thrust balancing.

The thrusts of the rotors depend considerably upon the density of the air entering the compressor, and thus vary independently of rotational speed of the engine. Nevertheless, the invention makes it possible to compensate the major part of the thrust of each rotor over the range of operating conditions of the rotor. As previously stated, for an engine with a compressor end thrust of 4200 pounds and a turbine end thrust of 5700 pounds under full load conditions, the cylinder may be proportioned to develop 4000 pounds thrust, which greatly reduces the thrust load on the bearings both under the conditions stated and under reduced load conditions such as result from high altitude operation.

In the example of application of the invention referred to above, the proportions of the cylinder relative to lubricating system pressure and shaft R. P. M. are such that approximately 40% of the 4000 pound thrust of the cylinder is due to static pressure of the lubricating oil supplied to the cylinder and approximately 60% is due to centrifugal force, at normal rated engine R. P. M. Obviously, these proportions may be varied to suit preferred operating conditions.

It would be possible to employ a sealed expansible chamber motor and dispense with the oil supply, relying entirely on centrifugal force for the balancing thrust. This would present disadvantages in that the sealed motor would overheat in certain locations, and would be disabled if a small leak developed in the wall of the chamber. Also, utilizing the static pressure of the lubricating oil supply permits the use of a smaller balancing area. The constant circulation of oil into and out of the balancing motor prevents overheating and prevents failure of the balance motor due to small leakage.

It will be apparent to those skilled in the art from the foregoing that the invention amply fulfills the objects and provides the advantages stated above. It will also be apparent that many modifications of the form and structure of the described embodiment may be made by those skilled in the art within the scope of the invention.

I claim:

1. A fluid dynamic apparatus comprising, in combination, a frame, two turbo-machines mounted thereon with coaxial rotors, so oriented that the end thrusts thereof in operation are opposed, bearing means on the frame for the rotors including a thrust bearing for each, and means defining a chamber containing flowable material coaxial with the rotors and rotatable with one of the rotors, the last-named means including relatively movable end walls coupled respectively to the two rotors in such sense that the pressure in the chamber due to centrifugal force on the said material opposes the end thrusts of the rotors.

2. A gas turbine engine comprising, in combination, a frame, a compressor and a turbine mounted thereon with coaxial rotors, so oriented that the end thrusts thereof in operation are opposed, bearing means on the frame for the rotors including a thrust bearing for each, and means defining a chamber containing flowable material coaxial with the rotors and rotatable with one of the rotors, the last-named means including relatively movable end walls coupled respectively to the two rotors in such sense that the pressure in the chamber due to centrifugal force on the flowable material opposes the end thrusts of the rotors.

3. A gas turbine engine comprising, in combination, a frame, a compressor and a turbine mounted thereon with coaxial rotors, so oriented that the end thrusts thereof in operation are opposed, bearing means on the frame for the rotors including a thrust bearing for each, an axially extensible shaft coupling the rotors, means defining a chamber containing flowable material coaxial with the rotors and rotatable with one of the rotors, the last-named means including relatively movable end walls and means coupling the said walls respectively to the two rotors in such sense that the pressure in the chamber due to centrifugal force on the flowable material opposes the end thrusts of the rotors, the means coupling one end wall to one of the said rotors comprising a tie member extending through the said axially extensible shaft.

4. A gas turbine engine comprising, in combination, a turbine, a compressor driven thereby, a shaft coupling the turbine and compressor, a frame, bearings mounted in the frame for the turbine and compressor, including a thrust bearing for each, the turbine and compressor developing opposed end thrusts when in operation, and means coupling the turbine and compressor rotors for transmission of end thrust therebetween comprising liquid-containing expansible-chamber means with relatively movable parts coupled to the turbine and compressor rotors, respectively, for axial movement and rotation therewith.

5. A gas turbine engine comprising, in combination, a turbine, a compressor driven thereby, a shaft coupling the turbine and compressor, a frame, bearings mounted in the frame for the turbine and compressor, including a thrust bearing for each, the turbine and compressor developing opposed end thrusts when in operation, and means coupling the turbine and compressor for transmission of end thrust therebetween comprising hydraulic motor means with relatively movable parts coupled to the rotors of the turbine and compressor, respectively, and means responsive to rotation of the engine to create a pressure in the motor to develop a thrust therein opposing the turbine and compressor thrusts.

6. A gas turbine engine comprising, in combination, a turbine, a compressor driven thereby, a shaft coupling the turbine and compressor, a frame, bearings mounted in the frame for the turbine and compressor, including a thrust bearing for each, the turbine and compressor developing opposed end thrusts when in operation, and means coupling the turbine and compressor for transmission of end thrust therebetween comprising expansible-chamber means with relatively movable parts coupled to the turbine and compressor rotors, respectively, for axial movement and rotation therewith, and means for supplying fluid to the expansible-chamber means to develop a thrust therein opposing the turbine and compressor thrusts by centrifugal force of the fluid therein.

7. A gas turbine engine comprising, in combination, a turbine, a compressor driven thereby, a shaft coupling the turbine and compressor, a frame, bearings mounted in the frame for the turbine and compressor, including a thrust bearing for each, the turbine and compressor developing opposed end thrusts when in operation, and means coupling the turbine and compressor for transmission of end thrust therebetween comprising expansible-chamber means with relatively movable parts coupled to the turbine and compressor rotors, respectively, for axial movement and rotation therewith, means for supplying fluid to the expansible-chamber means to develop a thrust therein opposing the turbine and compressor thrusts by centrifugal force of the fluid therein, and means for bleeding fluid from the expansible-chamber means to provide fluid circulation therethrough.

8. A gas turbine engine comprising, in combination, a turbine, a compressor driven thereby, a shaft coupling the turbine and compressor, a frame, bearings mounted in the frame for the turbine and compressor, including a thrust bearing for each, the turbine and compressor developing opposed end thrusts when in operation, and means coupling the turbine and compressor rotors for transmission of end thrust therebetween comprising means actuated by rotation of the said shaft to develop a thrust opposing the turbine and compressor thrusts.

9. A gas turbine engine comprising, in combination, a turbine including a shaft, a compressor including a shaft coaxial with the turbine shaft, the turbine and compressor developing opposed end thrusts when in operation, a frame supporting the turbine and compressor, bearings for the turbine and compressor shafts in the frame comprising a thrust bearing for each shaft, means for rotatively coupling the shafts, an expansible-chamber motor coaxial with the shafts, the said motor defining a fluid chamber comprising two parts relatively movable axially of the shaft, means actuated by rotation of one of the shafts for effecting rotation of the fluid in the chamber, and means coupling the said motor parts each to one of the shafts so that thrust of the motor due to centrifugal force therein is transmitted to each shaft in opposite sense to the thrust of the rotor mounted thereon.

10. A rotary mechanism comprising, in combination, a first turbo-machine including a shaft, a second turbo-machine including a shaft coaxial with the first-named shaft, the two turbo-machines developing opposed end thrusts when in operation, a frame supporting the turbo-machines, bearings for the said shafts in the frame comprising a thrust bearing for each shaft, an expansible-chamber motor coaxial with one of the shafts and rotatable therewith, the said motor defining a fluid chamber comprising two parts relatively movable axially of the shaft, means for supplying fluid to the chamber, and means coupling the said motor parts each to one of the shafts so that thrust of the motor due to centrifugal force therein is transmitted to each shaft in opposite sense to the thrust of the rotor mounted thereon.

11. A gas turbine engine comprising, in combination, a turbine including a shaft, a compressor including a shaft coaxial with the turbine shaft, the turbine and compressor developing opposed end thrusts when in operation, a frame supporting the turbine and compressor, bearings for the turbine and compressor shafts in the frame comprising a thrust bearing for each shaft, means for rotatively coupling the shafts, an expansible-chamber motor coaxial with one of the shafts and rotatable therewith, the said motor defining a fluid chamber comprising two parts relatively movable axially of the shaft, and means coupling the said motor parts each to one of the shafts so that thrust of the motor due to centrifugal force therein is transmitted to each shaft in opposite sense to the thrust of the rotor mounted thereon.

12. A gas turbine engine comprising, in combination, a turbine including a shaft, a compressor including a shaft coaxial with the turbine shaft, the turbine and compressor developing opposed end thrusts when in operation, a frame supporting the turbine and compressor, bearings for the turbine and compressor shafts in the frame comprising a thrust bearing for each shaft, means for rotatively coupling the shafts, an expansible-chamber motor coaxial with one of the shafts and rotatable therewith, the said motor defining a fluid chamber comprising two parts relatively movable axially of the shaft, means for supplying fluid to the chamber, means coupling the said motor parts each to one of the shafts so that thrust of the motor due to centrifugal force therein is transmitted to each shaft in opposite sense to the thrust of the rotor mounted thereon, and means for bleeding fluid from the said chamber to provide circulation of fluid therethrough.

13. A gas turbine engine comprising, in combination, a turbine including a shaft, a compressor including a shaft coaxial with the turbine shaft, the turbine and compressor developing opposed end thrusts when in operation, a frame supporting the turbine and compressor, bearings for the turbine and compressor shafts in the frame comprising a thrust bearing for each shaft, means for rotatively coupling the shafts, an expansible-chamber motor coaxial with one of the shafts and rotatable therewith, the said motor defining a fluid chamber comprising two parts relatively movable axially of the shaft, means for supplying fluid through the shaft to the chamber, means coupling the said motor parts each to one of the shafts so that thrust of the motor due to centrifugal force therein is transmitted to each shaft in opposite sense to the thrust of the rotor mounted thereon, and means for bleeding fluid from the said motor to lubricate a said shaft bearing.

14. A turbomachine comprising, in combination, a stator, a rotor therein developing end thrust in operation, thrust bearing means for the rotor at one end thereof fixed relative to the stator, and means at the other end of the rotor for developing a thrust opposed to the rotor end thrust to reduce the load on the thrust bearing, the last named means being adapted to accommodate relative longitudinal expansion of the stator and rotor in operation and comprising an expansible chamber device with relatively movable parts coupled to the rotor and stator respectively for transmission of thrust axially of the rotor, and means actuated by rotation of the rotor to develop an end thrust in the expansible chamber device.

15. A turbomachine comprising, in combination, a stator, a rotor therein developing end thrust in operation, thrust bearing means for the rotor at one end thereof fixed relative to the stator, and means at the other end of the rotor for developing a thrust opposed to the rotor end thrust to reduce the load on the thrust bearing, the last named means being adapted to accommodate relative longitudinal expansion of the stator and rotor in operation and comprising an expansible chamber device with relatively movable parts coupled to the rotor and stator respectively for transmission of thrust axially of the rotor, the expansible-chamber device being coupled to the rotor for rotation therewith and containing a flowable material so that rotation of the device develops an end thrust in the device by the action of centrifugal force on the material therein.

16. A turbomachine comprising, in combination, a stator, a multistage rotor therein developing end thrust in operation, thrust bearing means for the rotor at one end thereof fixed relative to the stator, and means at the other end of the rotor for developing a thrust opposed to the rotor end thrust to reduce the load on the thrust bearing, the last named means being adapted to accommodate relative longitudinal expansion of the stator and rotor in operation and comprising an expansible chamber device with parts relatively movable axially of the rotor, the said device being coupled to the rotor for rotation therewith and containing a flowable material adapted to exert forces directly oppositely of the axis of the rotor on the said parts under the action of centrifugal force on the said material, and means coupling the said parts to the rotor and stator, respectively, for transmission of thrust axially of the rotor to the rotor and stator.

17. A turbomachine comprising, in combination, a stator, a rotor therein developing end thrust in operation, thrust bearing means for the rotor fixed relative to the stator, and means for developing a thrust opposed to the rotor end thrust to reduce the load on the thrust bearing comprising an expansible chamber device containing a flowable material, the expansible chamber device including first and second walls coupled to the rotor for rotation therewith and relatively movable axially of the rotor, means coupling the said walls to the rotor and stator, respectively, for transmission of thrust thereto axially of the rotor, the said device being adapted to develop the said opposed thrust by pressure due to centrifugal force on the material therein acting on the said movable walls.

18. A rotary machine comprising two members relatively rotatable about a common axis, the members being of such character that relative rotation thereof is accompanied by a force urging the members relative to each other in a direction parallel to the axis, two thrust bearings connected to the members for resisting the said force, one thrust bearing being fixed to both members and the other thrust bearing being fixed to one member and being movable along the said axis relative to the other member, and means responsive to relative rotation of the members to generate a thrust along the said axis, the said means including relatively movable parts fixed respectively to the said other member and the said other thrust bearing.

19. A rotary machine as recited in claim 18 in which the thrust generating means is an expansible chamber motor mounted for rotation with one of the members and containing a flowable material so that centrifugal force on the material generates a thrust in the motor.

References Cited in the file of this patent

UNITED STATES PATENTS

| | | |
|---|---|---|
| 2,319,913 | Bentley | May 25, 1943 |
| 2,444,659 | Lundquist | July 6, 1948 |
| 2,475,316 | Garraway | July 5, 1949 |